P. R. WALSH.
BIFOCAL LENS.
APPLICATION FILED OCT. 20, 1920.
1,396,303. Patented Nov. 8, 1921.
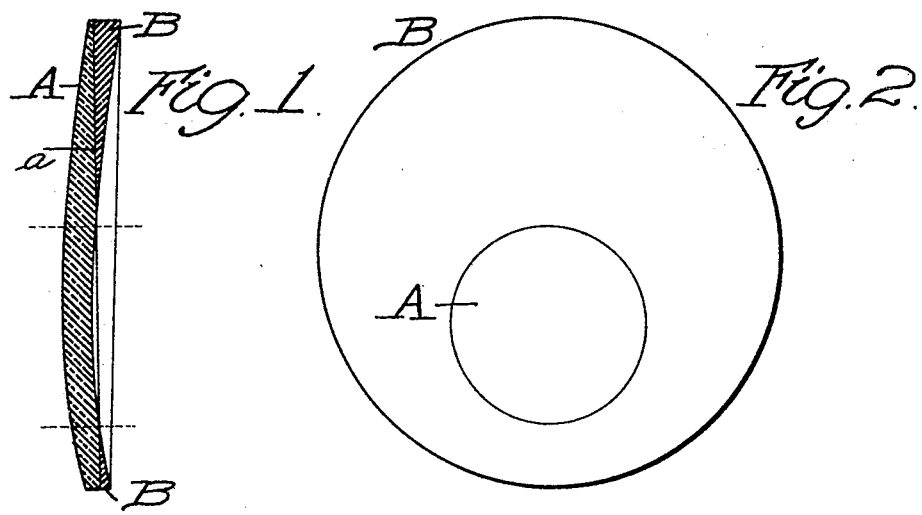
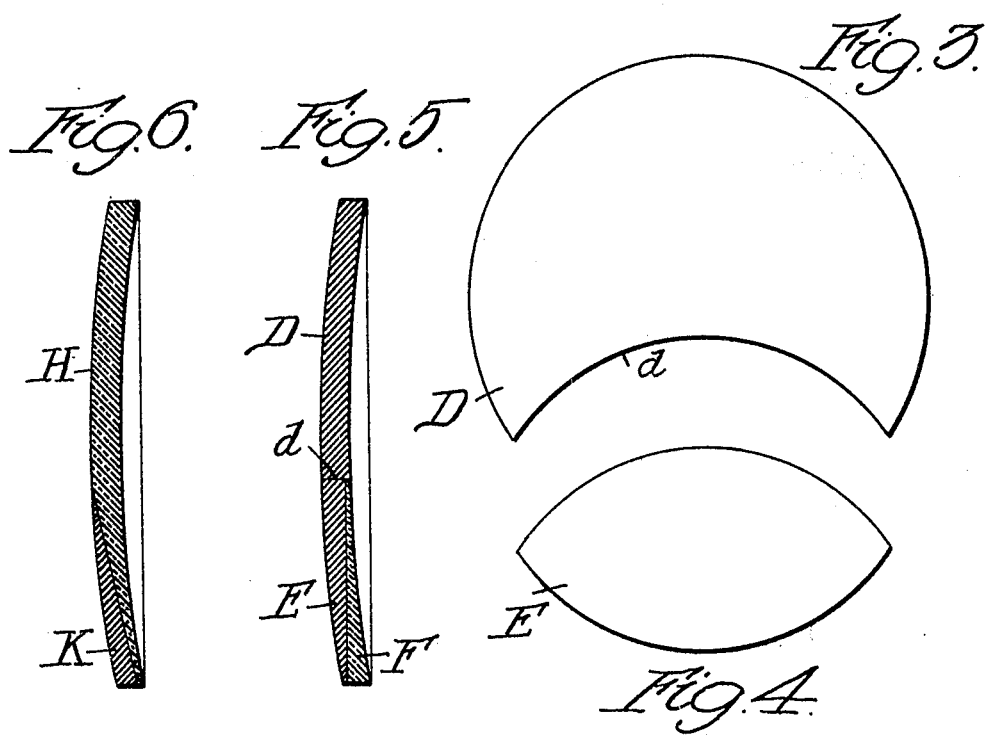
Witness
C. F. Wesson.
Inventor
Peter R. Walsh.
By Attorneys
Southgate & Southgate.

UNITED STATES PATENT OFFICE.

PETER R. WALSH, OF WORCESTER, MASSACHUSETTS.

BIFOCAL LENS.

1,396,303.  Specification of Letters Patent.  Patented Nov. 8, 1921.

Application filed October 20, 1920. Serial No. 418,198.

*To all whom it may concern:*

Be it known that I, PETER R. WALSH, a citizen of the United States, residing at Worcester, in the county of Worcester and State of Massachusetts, have invented a new and useful Bifocal Lens, of which the following is a specification.

This invention relates to a bifocal lens and process of making the same.

The principal object of the invention is to provide a bifocal lens having uniform curves, the curves on one portion of the surface containing one focal point being the same as the curves on a portion of the surface containing a different focal point, and at the same time to avoid the employment of different curvatures on the surface of the lens, or in the interior thereof. This avoids the obstacle to vision which the eye finds in the ordinary bifocal lens when passing from one set of curves to another.

Reference is to be had to the accompanying drawings in which—

Figure 1 is a central sectional view of a bifocal lens constructed in accordance with this invention, with the curvature exaggerated;

Fig. 2 is a rear elevation thereof;

Fig. 3 is an elevation of a lens cut for the purpose of carrying out this invention in another way;

Fig. 4 is a similar view of a lens adapted to be applied thereto;

Fig. 5 is a transverse sectional view of a complete bifocal lens constructed of elements like those shown in Figs. 2 and 3 in accordance with this invention, and Fig. 6 is a view similar to Fig. 1 showing a third method of carrying out this invention.

In all bifocals at the present time in use the additional focal power is obtained by having more curvature on one section of the surface than on the other. The bifocals at present in use are of two kinds; cemented and solid. The solid bifocals are divided into two classes. One is made by fusing together glasses of different indexes of refraction and the other by grinding an additional curvature on a small section of a lens.

Of the former class, the only lens in use at present is one in which a cavity is formed by grinding and polishing it in a piece of glass of a certain index of refraction. Another piece of glass of a different index of refraction is ground and polished to a corresponding convex curve and placed in said cavity. The assembled pieces are subjected to heat until they are welded into a single homogeneous block or blank and finally ground and shaped into a lens having two focal points, one of which includes both kinds of glass and the other a single kind of glass. On account of the different indexes of refraction of the two kinds of glass thus joined together on their curved surfaces a focal point or lens power is obtained underneath the surfaces of the finished block or blank. The eye passing from one set of curves to another finds an obstacle to vision.

In order to avoid this obstacle I prefer to construct my bifocal lens in the following manner, referring to Figs. 1 and 2: I take two pieces of glass of different indexes of refraction, as A and B, and grind a plane surface on one side of each. I then place these two surfaces together in contact along a plane $a$ and subject them to heat, and by any of the ordinary well-known processes cause them to be fused or welded into a single integral piece of glass as indicated in Fig. 1. I then grind upon a surface of the glass B, for example, the one having the higher index of refraction, a concave curve of a definite curvature. This is ground until the center of the curve extends into the glass A of the lower index of refraction which may be crown glass for example. This can be ground as deep and as large as required. Then the side containing both flint and crown glass and the concave curve is polished. The other side consisting of a crown glass surface only can be ground to any desired curve or curves. This produces a bifocal lens in which the difference in focal point will be due to the different indexes of refraction and not to any difference of curvature.

Another method of securing practically the same result is shown in Figs. 3, 4 and 5. Here I take a piece of flint glass as D and remove a section from it all the way through along the line $d$. Then I take two pieces of glass as E and F, one flint and the other crown for example, and grind a plane surface on each and polish the same. I place these two plane surfaces together in contact and fuse them together into one integral piece of glass. Then the curved edge of $d$ is ground and polished and the circular edge of this piece E—F is also ground and polished to fit it exactly. Then they are placed in contact and these curved surfaces along the line *d* are fused or welded into one integral piece as shown in Fig. 5. This gives a blank which may be manipulated as desired. A concave curve is ground on one surface of this blank, mainly in the flint but entering the crown, and the other side can be ground to any spherical, cylindrical, or other convex curve desired. As in the other case, the difference in focal point is obtained solely from the difference in the indexes of refraction of the different kinds of glass and there is uniformity of curvature on all sections of each side of the finished lens.

A third form of lens is indicated in Fig. 6. Here a piece of glass H, originally of the general shape to which the lens is to be reduced, is used as the blank. A small section is removed from one side of it along a plane. This does not go all the way through. This plane is ground and polished. Then a plano-convex lens K is ground and polished on its flat side to fit into this recess. This is fused or welded into one integral piece of glass forming the real blank as shown in this figure. This blank consists of two pieces only. It is then ground to a concave surface on the all crown side and the other side ground and polished to suit. The convex curve extends over the piece K. This lens has properties similar to the other two described above. I prefer that the large piece of glass shall be of crown glass and the small piece of flint glass, but I do not wish to restrict myself thereto.

It will be seen that in all these cases the section containing the greater refractive power and the smaller section of the lens used as the reading field of vision has the same curves externally and internally as the larger section used for the distance field of vision. Thus no obstacle to the vision of the eye in its motion from one field of vision to the other is encountered. This constitutes an important improvement over those solid bifocals which are made by grinding a concavity in one blank and fusing or welding thereto another blank having an external surface of the same curvature and also is an improvement over those bifocals which have different curvatures on the same external surface.

Although I have illustrated and described only three forms of the invention I am aware of the fact that other modifications can be made therein by any person skilled in the art without departing from the scope of the invention as expressed in the claims.

Therefore I do not wish to be limited to all the details of construction or procedure herein shown and described, but what I do claim is:—

1. As an article of manufacture, a bifocal lens comprising two pieces of glass of two different indexes of refraction united together, said lens having continuous uniform curves on both sides, that on one side extending through one glass into the other glass, the entire convex surface being of one kind of glass, whereby the curves on the distance field of vision and on the reading field of vision are the same.

2. As an article of manufacture, a bifocal lens comprising two pieces of glass having different indexes of refraction fused together along a plane surface and having a curved surface ground on one side and extending through the glass on that side and into the other piece of glass, the opposite surface being located on a single kind of glass.

3. As an article of manufacture, a bifocal lens consisting of two co-extensive pieces of glass having different indexes of refraction fused together throughout the entire area of the lens along a surface and having a continuous concave surface ground on one side all the way through one of them at a distance from its edges and extending into the other piece of glass.

4. As an article of manufacture a bifocal lens comprising a piece of crown glass and a piece of flint glass fused together along a plane surface, said lens having a concave surface ground on one side and extending through one piece into the other piece of glass, the other side of the lens consisting of a single kind of glass only, ground to the desired curvature, whereby the portion of the lens that contains one focal point is composed of both crown and flint glass and the portion that contains the other focal point is composed of a single kind of glass, and the curvature on each side of the lens is uniform.

In testimony whereof I have hereunto affixed my signature.

PETER R. WALSH.